(12) United States Patent
Mueller et al.

(10) Patent No.: US 7,041,194 B1
(45) Date of Patent: May 9, 2006

(54) MOISTURE ACTIVATED REINFORCEMENT STRING AND TEAR OPENING TAPES FOR CORRUGATED AND CARTONSTOCK CONTAINERS

(75) Inventors: Greg S. Mueller, Andover, MN (US); Sharf U. Ahmed, Woodbury, MN (US)

(73) Assignee: Adalis Corporation, Vancouver, WA (US)

( * ) Notice: Subject to any disclaimer, the term of this patent is extended or adjusted under 35 U.S.C. 154(b) by 0 days.

(21) Appl. No.: 09/193,889

(22) Filed: Nov. 18, 1998

Related U.S. Application Data

(63) Continuation-in-part of application No. 09/078,839, filed on May 14, 1998, now Pat. No. 5,869,596.

(60) Provisional application No. 60/070,831, filed on Jan. 8, 1998.

(51) Int. Cl.
*C08G 69/40* (2006.01)
*C08G 73/10* (2006.01)

(52) U.S. Cl. ............. 156/314; 229/235; 428/221; 428/77

(58) Field of Classification Search ............. 428/77; 229/230, 239, 102, 43, 235, 123.2, 124, 149, 229/238; 156/314
See application file for complete search history.

(56) References Cited

U.S. PATENT DOCUMENTS 4,784,271 A * 11/1988 Wosaba et al. ............. 206/617

FOREIGN PATENT DOCUMENTS

| JP | 63-191879 | 8/1988 |
| WO | WO 96/08538 | 3/1996 |

* cited by examiner

*Primary Examiner*—Richard C. Weisberger

(57) ABSTRACT

The present invention relates to a moisture or water activatable tape or string useful for reinforcing and/or for tear tape opening systems for various corrugated and cartonstock containers.

22 Claims, No Drawings

MOISTURE ACTIVATED REINFORCEMENT STRING AND TEAR OPENING TAPES FOR CORRUGATED AND CARTONSTOCK CONTAINERS

RELATED APPLICATIONS

This application is a Continuation-In-Part of provisional U.S. Patent Application Ser. No. 60/070,831 filed Jan. 8, 1998 and a Continuation-In-Part of U.S. patent application Ser. No. 09/078,839 filed May 14, 1998 now U.S. Pat. No. 5,869,596.

FIELD OF THE INVENTION

The present invention relates to a moisture or water activatable tape or string useful for reinforcing and/or for tear tape opening systems for various corrugated and cartonstock containers.

BACKGROUND OF THE INVENTION

A variety of paper and paperboard materials are used to manufacture cases, cartons, and trays for packaging purposes. Such paper and paperboard materials include virgin and recycled kraft, high and low density kraft, corrugated, and cartonstock also known as boxboard or chipboard, and various treated and coated variations of such.

Corrugated board is made of two paper components, namely linerboard and medium, held together by starch. The specific combination of medium and linerboards determines the type, strength and overall performance of the corrugated board. There are many different corrugated machines in production today. However, all corrugated board is manufactured using primarily the same production process.

In the basic process, a first roll of linerboard, typically the liner which will form the inside of the corrugated container, and a first roll of medium are mounted on roll stands. The medium is conditioned in a steam bath and then enters the corrugating rolls where it is pressed between two fluting rolls to form the intended flute pattern. The flute tips on one face of the medium are then coated with starch (aqueous glue) and brought in contact with the first liner. Starch is then applied to the medium flute tips on the opposing face which is then contacted to a second liner, typically the outside liner board. The composite of fluted medium sandwiched between two linerboards is then advanced to heated steam chests or hot plates where the starch is dried resulting in the fluted medium being adhesively bonded to the linerboards at the flute tips. For doublewall and triplewall board, each wall or layer is produced separately by first bonding the fluted medium to a single liner and then bonding the single layers to each other.

It is often desirable to increase the strength of the corrugated board. This is typically done with reinforcement strings consisting of a continuous fibrous substrate such as a yarn coated with a hot melt adhesive composition. The strings are positioned at various intervals on top of the flute tips, typically perpendicular to the fluting, prior to bonding the flute tips to the second linerboard.

Hot melt coated tapes are employed for reinforcement as well as for opening systems for corrugated and cartonstock containers, such as those typically found on laundry detergent boxes and various next day mail envelopes. For this application, the tape is positioned and bonded to the corrugated in such a manner to cleanly tear through the corrugated or boxboard layers. Tear tapes are generally multi-layered composites comprising a fibrous web coated with a hot melt adhesive which is bonded to either a paper or polyamide backing.

Tear opening tapes systems, such as those described in U.S. Pat. No. 5,098,757 issued Mar. 24, 1992, are typically incorporated in the corrugation process during what has commonly been called the "doublebacker" segment of the corrugated board forming machine. The doublebacker is the portion of the process wherein the preformed wall boards (liner/medium/liner) are bonded to each other.

Reinforcement strings and opening tapes are sold by H.B. Fuller Company under the trade names Sesame® Tape and String King® Reinforcement strings. All such products currently available employ hydrophobic hot melt adhesive compositions which are essentially unaffected by moisture or water. The heat of the corrugation process, which is used to dry the starch, melts or softens the hot melt adhesive composition on the coated tape or string to bond the fibrous core to the corrugated or cartonstock. The temperature and duration of time the corrugated materials are exposed to heat during the corrugation process varies widely. Therefore, a variety of tape and string products have been developed in order to match the melting temperature, open time, and viscosity of the hot melt adhesive on the tape or string with the conditions of the corrugation operation.

SUMMARY OF THE INVENTION

The present invention is a moisture activable, rather than heat activatable reinforcement string or opening tape. By employing an adhesive composition that is activated by the moisture, rather than the heat, it is possible to create a "universal" reinforcement string or opening tape.

The present invention is a continuous fibrous substrate ranging in width from about 0.2 mm to 90 mm and more typically from about 3 mm to about 50 mm, coated with a moisture activatable adhesive. The adhesive is present on at least one surface and preferably on at least two opposing surfaces of the continuous fibrous substrate. Depending on the shape and dimensions of the continuous fibrous substrate, once coated with adhesive, a moisture activatable string or tape is formed. The adhesive may be in solvent form, particularly aqueous form. However, the adhesive is preferably a moisture activatable hot melt adhesive, also referred to as remoistenable hot melt adhesive compositions.

The adhesive is sufficiently sensitive to moisture such that a fiber-tearing bond is formed with the medium and linerboard during the corrugation drying process, when the moisture from the water based starch adhesive employed is driven off. Additionally, the adhesive is sufficiently heat resistance such that the adhesive will not soften at temperatures less than 120° F. (49° C.), preferably maintaining sufficient bond strength up to about 140° F. (60° C.). The adhesive is preferably humidity resistant, such that the adhesive coated string or tape can be wound on a spool without blocking or sticking to itself. In the case of hot melt adhesives, it is also important that the adhesive possess the proper consistency or molten viscosity, such that it can be uniformly coated onto the continuous fibrous substrate.

In another embodiment, the present invention is a tear tape opening system comprising a continuous fibrous substrate and a moisture activatable adhesive composition. However, for tear tapes and reinforcement tapes/strings applied to the outside of the container, the tapes/strings require moistening prior to application. In this embodiment, the present invention advantageously prevents problems associated with the hot melt being forced out beyond the edges of the corrugated, resulting in adhesive contamination problems.

DETAILED DESCRIPTION OF THE INVENTION

The moisture activatable reinforcement string or opening tape of the present invention comprises a continuous fibrous substrate, such as a yarn, coated with a moisture activatable adhesive composition. Accordingly, the present invention is a continuous fibrous composite comprising a continuous fibrous substrate coated on at least one surface and preferably on at least two opposing surfaces with a moisture activatable adhesive composition. The continuous fibrous substrate contributes the strength, whereas the adhesive is primarily present for the purpose of adhering the continuous fibrous substrate to the corrugated or boxboard substrate.

The continuous fibrous substrate may be comprised of any of a variety of natural or synthetic fiber materials including fiberglass, polyester, rayon, nylon, aramide (KEVLAR), and mixtures thereof. In the case of tapes, the continuous fibrous substrate is typically a woven or nonwoven web. In general, fibrous materials are employed that have a softening temperature higher than the application temperature of the hot melt adhesive composition the fibers are to be coated with. Hence, the fibrous substrate typically has a melt point greater than 100° C., preferably greater than 140° C., more preferably greater than 170° C., and in most instances greater than about 210° C.

The continuous fibrous substrate ranges in size from about 3 mm to about 50 mm. Depending on the dimensions of the continuous fibrous substrate, a string or tape product is produced. In the context of the present invention, "string" will be defined as a coated substrate having a substantially circular cross-section ranging in diameter from about 0.25 mm to about 5 mm, and preferably from about 0.5 mm to about 2 mm. "Tape" refers to a coated substrate having a flat or rectangular cross-section ranging in width from about 1.5 mm to about 90 mm, and preferably from about 2 mm to about 30 mm. The tensile strength of the adhesive coated continuous fibrous substrate typically ranges from about 10 to 300 lb. (4.5 to 135 kg), elongates from about 3 to 50% and generally has a basis weight from about 0.50–30 g/10 ft.

The continuous fibrous substrate is coated with a moisture activatable adhesive composition. The adhesive is present on at least one surface of the continuous fibrous substrate and typically on at least two opposing surfaces. In most instances, the entire exterior surface of the continuous fibrous substrate is substantially continuously coated with the adhesive. Moisture activable adhesives are commonly called remoistenable adhesives. The terminology "remoistenable" arose from the fact that the first classes of adhesives that were used in this fashion were water-based. The adhesive was applied to an envelope, stamp, packaging tape, sticker or label, in an aqueous form and dried, resulting in a non-tacky adhesive layer. Subsequently, the adhesive was activated by remoistening the adhesive. Several of these water-based adhesives have been replaced by water or moisture activatable hot melt adhesives. In contrast, the hot melt adhesives are applied molten. Although technically the adhesive is not remoistened, in that the adhesive was never "wet" in the first place, these applications continue to be described as remoistenable adhesive applications.

A wide variety of remoistenable adhesives are known. In general, in order to be remoistenable, at least 30% and preferably at least 50% of the adhesive ingredients must be water sensitive. The term "water sensitive" means soluble, dispersible and/or swellable in aqueous environment water. In the case of repulpable application water soluble or water dispersible materials rather than merely swellable are preferred.

The remoistenable adhesive may be solvent based, particularly aqueous based. However, remoistenable hot melt adhesives are preferred since it is unnecessary to dry the adhesive after coating the adhesive onto the continuous fibrous substrate.

Preferably, the remoistenable adhesives for use in the present invention exhibit the following properties:

| | |
|---|---|
| Brookfield Viscosity (Hot Melts)- | 1,000 cPs–40,000 cPs at 350° F. (177° C.) More preferably 20,000 cPs–30,000 cPs |
| Rate of Remoistening- | <30 seconds |
| Bondability- | 90–100% fiber tear |
| Blocking at 90% RH/85° F. (29° C.)- | Good |
| at 90% RH/100° F. (38° C.)- | Good |

The adhesive is sufficiently sensitive to moisture such that a fiber-tearing bond is formed from the moisture produced during the corrugation drying process. Alternatively, in the case of tapes and strings applied to the outside of the container, the adhesive develops bondability by the application of water or an aqueous based solution prior to contacting the tape or string with the container. The adhesive is preferably humidity resistant, such that the adhesive coated string or tape can be wound on a spool without blocking or sticking to itself. Hence, it is important to balance the moisture sensitivity with the humidity resistance. In some instance, the adhesive may be too sensitive to moisture, resulting in the wound string absorbing moisture from the air, becoming tacky to the extent that the string or tape will no longer unwind. In other instances, the adhesive may have good blocking resistance, yet be too slow to form a bond at typical line speeds for automated packaging operations. For remoistenable compositions having poor blocking resistance, the applicants surmise the adhesive coated string may be dusted with a detackifying dusting agent such as talc, silica, or wax to reduce the tendency of the string to stick to itself once wound on a spool.

Additionally, the adhesive is sufficiently heat resistance such that the adhesive will not soften at temperatures less than 120° F. (49° C.) and preferably maintaining sufficient bond strength up to about 140° F. (60° C.). This property is important to insure the reinforcement properties contributed by the string or tape are operable throughout the storage temperature range at typical warehouse conditions.

In the case of hot melt adhesives, it is also important that the adhesive possess the proper consistency or molten viscosity such that it can be uniformly coated onto the continuous fibrous substrate. Further, if the continuous fibrous substrate is comprised of heat sensitive fibers, the desired molten viscosity is obtained at a temperature less than the softening point of the continuous fibrous substrate being coated. At too low of a viscosity it is difficult to coat the yarn with the desired concentration of adhesive without multiple applications. In contrast, if the viscosity is too high, it is difficult to coat the continuous fibrous substrate uniformly. Additionally, at high viscosity, the concentration of adhesive applied can exceed the target amount increasing the cost as well as making the string and tapes visibly apparent by causing bulging of the boardstock.

The adhesive is coated onto the continuous fibrous substrate at an amount ranging from about 25 wt-% to about 75 wt-% with respect to the total weight of the composite. For tapes, the amount of adhesive is preferably about 40 wt-% to about 70 wt-% and most preferably form about 50 wt-% to about 60 wt-%. In the case of stings, slightly higher concentration of adhesive are more preferred, ranging from about 50 wt-% to about 70 wt-%. Hence, the ratio of fibrous substrate to adhesive ranges from about 1:3 to about 3:1.

The remoistenable adhesive coated tapes and strings may be used in a variety of reinforcement applications for corrugated and cartonstock containers. The remoistenable adhesive coated string or tape may be positioned at various intervals between the corrugated linerboard and fluted medium to reinforce various corrugated containers. In other instances, the reinforcement string may be moistened and adhered to the exterior of the corrugated or boxboard container. Such strings and tapes may be employed for reinforcing handles, particularly for beverage containers; score line reinforcement to prevent tearing of folded corrugated and carton stock; fork lift pull sheets and hinges for appliance boxes, bulk bins, reinforcement for preventing side bulging, etc. Additionally, the moisture activatable tapes may be employed for tear opening tape systems such as those described in U.S. Pat. No. 5,098,757 issued Mar. 24, 1992, incorporated herein by reference.

Remoistenable adhesives are typically based on amorphous water sensitive thermoplastic polymers, crystalline water sensitive thermoplastic polymers, as well as non-water sensitive polymers combined with water sensitive ingredients such as water sensitive tackifying resins, water sensitive waxes, and/or water sensitive additives. In the case of hot melt remoistenable adhesives, the water sensitive ingredients employed are typically thermoplastic and preferably heat stable.

The term "crystalline" means those materials, which retain their rubbery elastomeric or flexible properties above the glass transition, until the melting temperature is surpassed. Melting is also accompanied by a loss of crystalline X-ray diffraction effects.

The term "amorphous" means those materials, that as the temperature is raised, gradually give way to a soft, extensible elastomeric phase, then to a gum and finally to a liquid. No sharp transition occurs from one phase to the other.

The term "polymer" refers to a component having a Mw greater than 3000.

One particularly preferred class of crystalline thermoplastic water sensitive polymer for use as the base polymer in remoistenable adhesives, particularly hot melt remoistenable adhesive, is water soluble polyamides. Such polyamides are the reaction product of at least one polyoxyalkylene diamine with at least one dicarboxylic acid or esters thereof.

The polyoxyalkylene diamine has the formula:

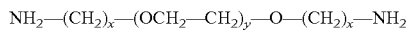

$$NH_2-(CH_2)_x-(OCH_2-CH_2)_y-O-(CH_2)_x-NH_2$$

wherein X ranges from 2 to 3 and Y ranges from 1 to 2.

Representative examples include triethylene glycol diamine, wherein X=2 and Y=1, and tetraethylene glycol diamine, wherein X=2 and Y=2. Commercial diamines include Jeffamine® 148 amine and Jeffamine® EDR-192 amine available from Huntsmen Chemical Co., Houston, Tex. A preferred diamine is 4,7,10-trioxatridecane-1,13-diamine (TTD diamine) available from BASF, Parsippany, N.J., wherein X=3 and Y=2. Other amines such as Jeffamine® D-230, D-400, ED-600, ED-900 and ED-2000 are also useful provided a chain terminator acid is employed during the reaction, and/or additional ingredients such as waxes, tackifiers, crystalline polymers, and monoacids are subsequently combined with the reacted polyamide. For example, when adipic acid is reacted with TTD diamine and Jeffamine® D-230, the resulting polyamide is relatively slow setting with respect to reacting adipic acid with TTD diamine alone.

The polyoxyalkylene diamine is reacted with an equal stochiometric ratio of a dicarboxylic acid. Suitable dicarboxylic acids are those having from 5 to 36 carbon atoms including adipic acid, pimelic acid, azelaic acid, sebacic acid, suberic acid, dodecanedioic acid, terephthalic acid, isophthalic acid, t-butyl isophthalic acid, dimer acid and mixtures thereof. The esters and anhydrides of these acids may also be used. Adipic acid is preferred.

The resulting water soluble polyether amide preferably has a melt point about 190° C. or less as in the case when adipic acid is reacted with Jeffamine® XTJ-504. More preferably, the melt point is about 155° C. or less as in the case when adipic acid is reacted with Jeffamine® EDR-192. The most preferred water soluble polyether amide has a melt point about 150° C. or less as in the case when adipic acid is reacted with TTD diamine. This particular combination results in a faster setting, strong, easily processed water soluble polyether amide. The low melt temperature makes this combination particularly attractive for low application temperature applied remoistenable hot melt adhesives having an application temperature less than 177° C. For this embodiment, it is also preferable that the molten viscosity of the polyamide be less than about 2,000 cPs at 177° C.

The applicants have found that certain polyamides are preferred due to their contribution to the nonblocking and humidity resistant properties. Polyamides exhibiting such properties are those which are produced by reacting polyoxyalkylene diamine with at least one dicarboxylic acid or an ester thereof, the polyoxyalkylene diamine having the formula:

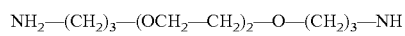

$$NH_2-(CH_2)_3-(OCH_2-CH_2)_2-O-(CH_2)_3-NH$$

In this embodiment, adipic acid is the preferred dicarboxylic acid. However, other acids may also be employed provided the mole percent of the additional acids is about 10 mole percent or less with respect to the total acid content. When an additional acid is employed at a concentration greater than about 10 mole percent, particularly at about 25 mole percent or greater with respect to the total acid content, the resulting polyamide exhibits a longer set time prior to becoming completely non-blocking. Accordingly, it is often desirable to add an additional ingredient to increase the rate of set as described in further embodiments as follows.

Additionally, other water soluble polyamides contribute comparable humidity and blocking resistance provided a chain terminator is employed during the reaction and/or the polyamide is further combined with at least one additional ingredient including waxes, solid tackifiers, monocarboxylic acids, and crystalline polymers. In these embodiments, the polyamide is produced by reacting at least one polyoxyalkylene diamine with dicarboxylic acid or an ester thereof, said polyoxyalkylene diamine having the formula:

$$NH_2-(CH_2)_2-(OCH_2-CH_2)_y-O-(CH_2)_n-NH_2$$

wherein X ranges from 2 to 3 and Y ranges from 1 to 2.

Chain terminators include monoacids and/or monoamines and are useful in an amount less than about 5 wt-%, preferably from about 0.5 wt-% to about 2.5 wt-% based on total acid weight to control the molecular weight. Representative examples of useful monocarboxylic acids include stearic acid, benzoic acid and montannic acid such as Wax S available from Hoechst Celanese. In the absence of a chain terminator, the resulting polyamide, particularly those taught by Speranza in U.S. Pat. Nos. 5,053,484, 5,086,162, 5,324,812, and 5,118,785 are deficient in at least one property including exhibiting a high melt point, slow rate of set, high viscosity, poor humidity resistance and/or poor blocking resistance.

In addition or in the alternative, the polyamide component may be combined with at least one ingredient selected from the group consisting of waxes, tackifiers, crystalline polymers, monocarboxylic acids and mixtures thereof. The monocarboxylic acids and monoamines have been found to be useful not only as a reactant as previously described but also as an ingredient to be added after the polyamide is formed.

NP-2126 as well as other grades of water soluble polyamides are commercially available from H.B. Fuller Company (St. Paul, Minn.).

The remoistenable adhesive for use in the invention may also be a fast setting water sensitive polyamide composition synthesized to have a combination of crystalline and amorphous characteristics. For this embodiment the water sensitive polyamide is produced by reacting at least one dicarboxylic acid, ester, or anhydride with at least one diamine wherein the at least one of the diamines is polyoxyalkylene diamine and at least of said reactants is aromatic. The polyamide has a glass transition temperature (Tg) of greater than about 15° C. and a heat of fusion from about 1 to about 30 Joules/gram.

Other crystalline water soluble thermoplastic material that may be employed in the remoistenable adhesive include polyethylene oxide and crystalline polyesters. Water sensitive polymers that can be synthesized to possess similar physical properties such as viscosity and extent of crystallinity to that of the exemplary polyamides are believed to be particularly useful.

Amorphous water sensitive thermoplastic polymer contemplated for use as the base polymer in the remoistenable adhesive, particularly hot melt remoistenable composition include such polymers as polyvinyl alcohol (PVOH) available from Nippon Grohsei (Japan) as GROHSERAN L-301 and GROHSERAN L-302 and as UNITIKA available from Unitaka Ltd. (Japan); polyvinyl pyrrolidone (PVP) available from BASF (Mount Olive, N.J.) and ISP (Wayne, N.J.); polyvinyl pyrrolidone/vinyl acetate copolymer (PVP/VA) and polyvinyl pyrrolidone/acrylic acid such as ACRYLIDONE, both available from ISP; polyethyloxazoline available from The Dow Chemical Company (Freeport, Tex.) under the tradename PEOX and from PCI Incorporated (Tucson, Ariz.) under the tradename AQUAZOL; polyvinyl methyl ether available from Amoco Chemical Co. under the tradename AMOBOND, linear polyesters, polyacrylamide and preferably water dispersible linear polyesters and branched copolyesters (EASTMAN AQ) as well as amorphous water soluble and water dispersible polyamide.

One particularly preferred class of amorphous water sensitive thermoplastic polymers is water dispersible copolyesters available from Eastman Chemical Company (Kingsport, Tenn.) under the tradename EASTMAN AQ. These water dispersible polymers are linear polyesters or branched copolyesters containing sulfonomer. Such polymers are saline and body fluid insoluble, yet dispersible in tap water. The Tg (glass transition temperature) of the branched water dispersible copolyesters ranges from −5° C. to 7° C., whereas the linear water dispersible polyesters have a Tg from about 30–60° C. Commercial examples of solid thermoplastic water dispersible linear polyesters include AQ 35S (7,000 Mn), AQ 38S (10,000 Mn), and AQ 55S (8,000 Mn).

Preferred water dispersible copolyesters are those which exhibit an intrinsic viscosity of about 0.6 IV (EASTMAN AQ-14000) or less, more preferably about 0.4 IV (EASTMAN AQ-1950) or less, even more preferably about 0.3 IV (EASTMAN AQ-1350) or less, and most preferably, particularly for low application temperature remoistenable adhesives, 0.2 IV (EASTMAN AQ-1045) or less. In terms of molten viscosity, these ranges correlate to a Brookfield viscosity ranging from about 5,000 to about 40,000 cPs. Higher viscosity versions may also be employed for compositions intended for applications where a low molten viscosity is not required. Information relating to the chemical synthesis of the branched polyesters may be found in U.S. Pat. Nos. 5,543,488 and 5,552,495, incorporated herein by reference. Lighter color and low odor modifications of such water dispersible copolyester are also contemplated, particularly for nonwoven applications in which odor and color tend to be important characteristics.

The remoistenable adhesive compositions employed in the present invention may further comprise, or be based on polymers, which do not swell or disperse in water. However, if the base polymer of the remoistenable adhesive is not water sensitive, water sensitive tackifiers, water sensitive waxes, and/or water sensitive fillers are employed such that at least about 50 wt-% of the adhesive composition is water sensitive. Such water insensitive polymers may be amorphous or crystalline. Suitable examples include ethylene-vinyl acetate copolymers containing about 12% to about 50% vinyl acetate, ethylene acrylic acid, ethylene methyl acrylate and ethylene n-butyl acrylate copolymers as well as polylactide, caprolactone polymers, and poly (hydroxy-butyrate/hydroxyvalerate), polyvinyl alcohol, linear saturated polyesters such as DYNAPOL or DYNACOLL polymers from Creanova Inc, (Piscataway, N.J.), poly(ethylene oxide)polyether amide and polyester ether block copolymers available from Elf Atochem (Birdsboro, Pa.) as PEBAX or Hoechst Celanese as RITE-FLEX) respectively, and polyamide polymers such as those available from Union Camp as UNIREZ from Union Camp (Savannah, Ga.), Huls as VESTAMELT or EMS-Chemie as GRILTEX.

The remoistenable hot melt adhesives useful in the present invention preferably comprise a wax in an amount up to about 30 wt-%, more preferably at an amount ranging from about 3 wt-% to about 20 wt-%-%, and most preferably ranging from about 5 wt-% to about 15 wt-%. Waxes useful herein are preferably polar in nature. Polar waxes are those which contain at least one polar functional group such as hydroxyl, amide, sulfone, phosphate, sulfonamide, urethane, carboxylate acid, amine, and carbonate. The concentration of the functional group is present in an amount greater than about $2 \times 10^{-3}$ equivalents per gram and preferably greater than $3.5 \times 10^{-3}$ equivalents per gram. The molecular weight of waxes ranges from about from about 200 g/mole to about 1000 g/mole. Representative examples including 12-hydroxystearamide, N-(2-hydroxy ethyl 12-hydroxy stearamide and N,N' ethylene bis 12-hydroxy stearamide (PARICIN 220 and PARICIN 285 respectively from CasChem, Bayonne, N.J.), stearamide (KEMAMIDE S from Witco, Memphis, Tenn.), glycerin monostearate, sorbitan monostearate, and 12-hydroxy stearic acid. Also useful alone or in combination with the above are less polar waxes such as N,N'-ethylenebis steramide (KEMAMIDE W-40 from Witco), linear aliphatic long chain alcohols (UNILIN 425 from Petrolite, Tulsa, Okla.), hydrogenated castor oil (castor wax), oxidized synthetic waxes, and functionalized waxes such as oxidized homopolymers and polyethylene waxes (PETROLITE E-1040). The Applicants have found that polar waxes having a melt point greater than 70° C., preferably greater than about 110° C., and more preferably about 140° C. or greater, are particularly advantageous.

The remoistenable adhesive compositions employed in the present invention preferably comprises a plasticizer in an amount up to about 10 wt-% and preferably in an amount ranging from about 1 wt-% to about 5 wt-%. Surprisingly, as little as about 3 wt-% of plasticizer improves the compatibility of the ingredients. Preferred compatible plasticizers include natural and polar liquid plasticizers including phthalate plasticizers such as dioctyl phthalate and butyl benzyl phthalate (e.g. SANTICIZER 160 from Monsanto, St. Louis, Mo.); liquid polyesters such as DYNACOL 720 from Huls, liquid polymeric plasticizer available from CP. Hall, Chicago, Ill.; benzoate plasticizers such as 1,4-cyclohexane dimethanol dibenzoate (e.g. BENZOFLEX 352 from Velsicol, Rosemont, Ill.), diethylene glycol/dipropylene glycol dibenzoate (e.g. BENZOFLEX 50 from Velsicol), dipropylene glycol dibenzoate (e.g. BENZOFLEX 9–88 from Velsicol), polypropylene glycol dibenzoate (e.g. BENZOFLEX 400 from Velsicol), and diethylene glycol dibenzoate where the mole fraction of hydroxyl groups which have been esterified ranges from 0.5 to 0.95 (e.g. BENZOFLEX 2–45 High Hydroxyl also from Velsicol); phosphite plasticizers such as t-butyl diphenyl phosphate (e.g. SANTICIZER 154 from Monsanto); polyethylene glycol having a molecular weight below about 1000 and derivatives of polyethylene glycol including PYCAL 94, the phenyl ether of PEG available from ICI (Wilmington, Del.); ethoxylated bis phenol A (e.g. MACOL 206 EM from PPG Industries, Pittsburgh, Pa.; dionyl phenol ethyoxylates (e.g. Surfonic DNP from Huntsman Chemical Corp.); liquid rosin derivatives having Ring and Ball softening points below about 60° C. such as methyl ester of hydrogenated rosin (e.g. HERCOLYN D from Hercules); as well as vegetable and animal oils such as glycerol esters of fatty acids and polymerizable products thereof. Preferred plasticizers include phenyl ether of PEG, butyl benzyl phthalate, toluene sulfonamide (UNIPLEX 214 from Unitex Chemical Corp., Greensboro, N.C.), acetyl tributyl citrate (CITROFLEX A-4, Moreflex Inc., Greensboro, N.C.), benzoate plasticizers such as 1,4-cyclohexane dimethanol dibenzoate, diethylene glycol/dipropylene glycol dibenzoate, and diethylene glycol dibenzoate where the mole fraction of hydroxyl groups which have been esterified ranges from 0.5 to 0.95.

The remoistenable adhesive employed in the invention may comprise tackifying resin(s). Tackifying resins useful herein are generally polar in nature and have a Ring & Ball softening point greater than 60° C. and include any compatible resins or mixtures thereof such as natural and modified rosins such as gum rosin, wood rosin, tall oil rosin, distilled rosin, hydrogenated rosin, dimerized rosin, and polymerized rosin; rosin esters such as glycerol and pentaerythritol esters of natural and modified rosins such as, for example, the glycerol ester of pale, wood rosin, and the glycerol ester of hydrogenated rosin, the glycerol ester of polymerized rosin, and the pentaerythritol ester of hydrogenated rosin, and the phenolic-modified pentaerythritol ester of rosin; phenolic modified terpene or alpha-methyl styrene resins as well as the hydrogenated derivatives thereof such as the resin product resulting from the condensation in an acidic medium of a bicyclic terpene and a phenol.

Representative examples of preferred tackifier include materials such as FORAL NC, KRISTALEX and ENDEX available from Hercules (Wilmington, Del.); non-ionic materials such as FORAL AX also from Hercules, alpha methyl styrene phenolics such as URATAK 68520 from DSM Resins (Panama City, Fla.), rosin esters such as UNITAC R100L available from Union Camp and terpene phenolic tackifiers such as NIREZ 300 and NIREZ V2040 available from Arizona Chemical (Panama City, Fla.).

A variety of additives such as antioxidants (IRGANOX 1010), pigments and fillers, particularly hydrophilic fillers such as starch or cellulose esters and acetates, may be employed in an amount up to about 10 wt-% provided such materials do not detract from the intended properties.

A preferred remoistenable hot melt adhesive for use in the present invention comprises a blend of amorphous water sensitive polymers and crystalline water sensitive polymers. The concentration of crystalline polymer is a function of the percent crystallinity, which can be measure by Wide Angle X-ray Scattering methods used for waxes. For this embodiment, the adhesive composition comprises from about 10 wt-% to about 90 wt-%, more preferably from about 15 wt-% to about 80 wt-%, even more preferably from about 15 wt-% to about 75 wt-%, and most preferably from about 20 wt-% to about 60 wt-% of at least one crystalline water sensitive thermoplastic polymer. The composition also comprises at least one amorphous water sensitive thermoplastic polymer present in an amount ranging from about 10 wt-% to about 90 wt-%, preferably from about 15 wt-% to about 80 wt-%, more preferably from about 15 wt-% to about 75 wt-%, and most preferably from about 15 wt-% to about 60 wt-%. The ratio of the crystalline water sensitive polymer to amorphous water sensitive polymer ranges from about 1:2 to about 2:1 and preferably is about 1:1. However, if the crystallinity of the polymer is significantly greater than 50%, for example about 70% or greater, lower concentration of crystalline polymer may be employed. In contrast, higher concentrations are useful if the percent crystallinity is less than about 30%. The crystalline component contributes the blocking resistance and humidity resistance, whereas the amorphous component improves the rate of bond formation. The composition preferably further comprises a wax.

Although hot melt remoistenable adhesives compositions are the preferred water sensitive adhesive employed in the present invention, water based remoistenable adhesives may also be used. In some instances, the water based adhesives may be comprised of the same base chemistries as the hot melt remoistenable compositions, provided the ingredients are water dispersible or available in an emulsion, solution or dispersion form. However, many water based remoistenable adhesives are based on natural or synthetic ingredients which are not thermoplastic such as animal glues, starch, dextrin, cellulose derivatives, modified glucose, algaenates, xanthan gum, etc.

EXAMPLES

Test Methods:
1. Melt Viscosity is determined in accordance with the following procedure using a Brookfield Laboratories DVII+ Viscometer in disposable aluminum sample chambers. The spindle used is a SC-27 hot-melt spindle, suitable for measuring viscosities in the range of from 10 to 100,000 centipoise. The sample is placed in the chamber, which is in turn inserted into a Brookfield Thermosel and locked into place. The sample chamber has a notch on the bottom that fits the bottom of the Brookfield Thermosel to ensure that the chamber is not allowed to turn when the spindle is inserted and spinning. The sample is heated to the desired temperature, with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on, and set to a shear rate, which leads to a torque reading in the range of 30 to 60 percent. Readings are taken every minute for about 15 minutes, or until the values stabilize, which final reading is recorded.

2. Blocking Resistance is determined by preparing a coating on a sheet of 20# bleached Kraft paper (standard copy paper) with the thermoplastic composition at a thickness ranging from about 0.6 to 1 mil (0.002 to 0.003 cm) using a suitable coating device or draw-down technique. The coated paper is then cut into 1 inch (2.5 cm) strips and conditioned at 50% relative humidity for two hours. At least three strips of the coated paper are placed on a tray and a piece of paper placed on top, sandwiching the thermoplastic composition between two paper layers. A 500 g weight is place on top of each strip resulting in a force of 500 g/sq. inch and the tray is placed in a 140° F. (60° C.) oven for 24 hours. After 24 hours, the uncoated paper is removed noting the extent of thermoplastic composition sticking or picking to the uncoated paper. The extent of blocking is characterized as follows:
"Excellent"—no picking, paper falls from polyamide without resistance
"Good"—the uncoated paper must be removed by hand and exhibits very slight picking
"Pass"—the uncoated paper must be removed by hand and exhibits significant picking, but no fiber tear
"Blocked"—the uncoated paper must be removed by hand and exhibits fiber tear 3. Humidity Resistance is tested in the same manner as blocking resistance with the exception that the test is conducted at 38° C. and 90% relative humidity for 24 hours.

4. Rate of Remoistening & Bondability First a hot melt adhesive sample and metal draw down bar are heated in an oven at 165° C. Once melted, a 0.5 to 1.0 mil (0.001 to 0.003 cm) film is applied to a paper substrate that is taped onto the laboratory benchtop. After cooling, the adhesive thickness of each coated sheet of paper is measured to ensure the film thickness falls between 0.5 and 1.0 mils (0.001 to 0.003 cm) thickness and is then cut into ½ inch (1.3 cm) strips. Next, a ½ inch (1.3 cm) coated strip is moistened with an applicator containing room temperature water and immediately pressed onto a second piece of bond paper with medium finger pressure (as you would seal an envelope). Immediately a stopwatch is started to measure the length of time elapsed from the point a coated strip is pressed onto bond paper until it is removed. When the coated strip is removed from the bond paper, the stopwatch is stopped and the elapsed time and percent fiber tear is recorded. The rate of remoistening is determined to be the length of time it takes a hot melt adhesive to develop a fiber tearing bond and the percent of fiber tear.

5. Bondability of Coated String/Tape
The bonded tape or string is evaluated by removing the tape slowly by hand from the corrugated at a 90° angle.

"Good" bondability is characterized by the tape or string forming a bond to both the liner and the flute tips. Upon removal of the tape/string 0–10% flute tip fiber tear is evident.

6. Rate of Set
Molten adhesive ranging in temperature from about 160° C. to about 177° C. is drawn down onto a paper substrate at a thickness of 0.5 mil (0.001 cm). The film is evaluated by cautiously contacting the film with ones fingertips immediately after being drawn. A "fast setting" composition is tack-free in about one second or less, whereas a slow setting composition takes longer to become tack-free.

Example 1

NP-2116, a remoistenable adhesive based on water soluble polyamide commercially available from H.B. Fuller Company (St. Paul, Minn.) was coated molten at a temperature of 400° F. (204° C.) onto yarn at a concentration of 60 wt-%, forming a hot melt coated string. The coated string was used as a reinforcement string in the production of a corrugated material at a rate of 400 ft/min. (120 m/min.). The string was positioned on top of the flute tips on the singleface liner just prior to applying the second (doubleface) linerboard. The composite of linerboard/fluted medium/reinforcement string/linerboard was advanced to the doublebacker portion of the corrugation process to dry the latex. Since the melt point of NP-2116 is 290° F. (143° C.) and the maximum temperature reached at the flute tips in the corrugation operation is about 240° F. (116° C.), the bond formation was moisture induced rather than heat induced, as in the case of conventional hot melt formulations. The moisture activatable reinforcement string was found to exhibit comparable bond performance to reinforcement strings coated with conventional hot melt formulations.

Example 2

85 wt-% of NP-2116 was combined with 13 wt-% Nirez V-2040 and 2 wt-% Castorwax MP80. This formulation was also formed into a hot melt coated string and bonded to corrugated as described in Example 1. This formulation also exhibited comparable bond performance to conventional hot melt coated string products Examples 3–9

A variety of other remoistenable adhesive compositions were tested to determine their suitability for use in moisture activatable reinforcement strings and tear tape. Examples 3 and 4 employ commercially available remoistenable adhesive compositions. Examples 5–9 exhibit preferred remoistenable compositions comprising at least one crystalline water sensitive thermoplastic polymer and at least one amorphous water sensitive thermoplastic polymer. The composition, physical properties and bond performance of the remoistenable adhesive can be found in Table I. Examples 3–4 were coated onto polyester yarn. The coated yarns were then moistened by and sandwiched between kraft paper, and pressed with a 230° F. (110° C.) iron to simulate the heated steam chest/hot plate step of the corrugation process. The samples were then examined for bond formation and then tested for bond strength.

Examples 5–7 were coated molten at a temperature of 177° C. onto 1000 d (1 g/9000 m) polyester yarn at a coat weight of 30 g/m (total weight of yarn and adhesive) to determine. The resulting string was wound by hand onto a spool. These compositions are surmised to be fast setting enough to be coated and wound at typical production rates of 1000 ft/min. (300 m/min.)

Table 2 depicts further examples of remoistenable adhesive compositions useful in the present invention employing other amorphous water sensitive polymers. Examples 10 and 11 employ a crystalline water sensitive polyamide in combination with the amorphous polyvinyl alcohol to improve

TABLE 1

| Ingredient Trade Name Wt-% | Example 3 | Example 4 | Example 5 | Example 6 | Example 7 | Example 8 | Example 9 |
| --- | --- | --- | --- | --- | --- | --- | --- |
| HL-9449-X | 100% | | | | | | |
| R-219 | | 100% | | | | | |
| AQ-1045 | | | 44.5 | 42.0 | 47 | 27 | 57 |
| NP-2126 | | | 42.5 | 40.0 | 40 | 60 | 30 |
| Paricin 285 | | | 10.0 | 10.0 | 7.5 | 10 | 10 |
| Paricin 220 | | | | 5.0 | 2.5 | | |
| Benzoflex 9-88 | | | 2.5 | 2.5 | 2.5 | 2.5 | 2.5 |
| Irganox 1010 | | | 0.5 | 0.5 | 0.5 | 0.5 | 0.5 |
| Rate of Remoistening & Bonding | | | | | | | |
| Initial-% Fiber Tear/Time | | | 100/30 | 100/30 | | 100/30 | 100/30 |
| After 24 hrs (% FT) | | | sec 100 | sec 95 | | sec 100 | sec 100 |
| Blocking Resistance | | | | | | | |
| At room temperature | | | Good | Good | | | |
| 90% RH/38C | | | Good | Good | | Good | Good |
| Bond Strength of Coated String | Fiber tear | Fiber tear | | | | | |
| Rate of Set | | | Fast | Fast | | Fast | Fast |
| Viscosity @ 163 C (cps) | | | 1407 | 1005 | | | |

HL-9449-X is a polyethyloxazoline based remoistenable hot melt adhesive available from H.B. Fuller Company (St. Paul, Minn.)

R-219 is a polyvinyl pyrrolidone vinyl acetate based remoistenable hot melt adhesive available from Moore Response (Green Bay, Wis.).

the blocking resistance. R-219, Eukalin 480 and HL-9449 represent commercially available remoistenable hot melt adhesives. The Eukaline 480 (Hunkeler Corp., Marietta, Ga.) is based on polyvinyl pyrrolidone. All three of these products were found to block at conditions of 70% relative humidity and 25° C. However, upon blending these products

TABLE 2

| Ingredient Trade name Wt-% | E | Example 10 | Example 11 | Example 12 | Example 13 | Example 14 |
| --- | --- | --- | --- | --- | --- | --- |
| Gohseran L-301 | 75.0 | 44.5 | 25.0 | | | |
| Glycerine | 12.5 | | | | | |
| 12 Hydroxy stearic acid | 12.5 | | | | | |
| NP-2126 | | 42.5 | 65.0 | 40.0 | 40.0 | 40.0 |
| Paricin 285 | | 10.0 | | | | |
| Benzoflex 9-88 | | 2.5 | 10.0 | | | |
| Irganox 1010 | | 0.5 | | | | |
| R-219 | | | | 60.0 | | |
| Eukaline 480 | | | | | 60.0 | |
| HL-9449 | | | | | | 60.0 |
| | | | PROPERTIES | | | |
| Rate of Remoistening & Bonding | | | | | | |
| Initial-% Fiber Tear/Time | 80/30 sec | 90/30 sec | 90/30 sec | 75/30 sec | 90/30 sec | 90/30 sec |
| After 24 hrs (% FT) | | 90% + | | 90% + | ~40% | 90% + |
| Blocking Resistance | | | | | | |
| At room temperature | Tacky | Good | Good | Good | Good | Good |
| 90% RH/38C | Blocked | Good | Good | Good | Good | Good |
| Rate of Set | Fast | Fast | Fast | Fast | Fast | Fast | with a crystalline water sensitive polymer the blocking resistance is significantly improved.

TABLE 3

|  | Example 15 | Example 16 | Example 17 | Example 18 |
|---|---|---|---|---|
| Ingredient Trade name Wt-% | | | | |
| NP-2126 | 70 | 62.5 | 75 | 75 |
| AQ 35S | 17 | 27 | 14.2 | 14.2 |
| Paricin 285 | 10 | 5 | 5 | 5 |
| Benzoflex 352 | | | 5 | |
| Benzoflex 400 | | | | 5 |
| Benzoflex 9-88 | 2.5 | 5 | | |
| Irganox 1010 | 0.5 | 0.5 | 0.5 | 0.5 |
| Cyanox LTDP | | | 0.3 | 0.3 |
| PROPERTIES | | | | |
| Rate of Remoistening & Bonding | | | | |
| Initial-% Fiber Tear/ Time After 24 hrs 100 F/90% RH | 100/30 sec. 100% | 100/30 sec. 100% | 100/30 sec. 100% | 100/30 sec. 100% |
| Blocking Resistance | | | | |
| At 100 F/90% RH | Good | Good | Good | Good |
| Rate of Set | Fast | Fast | Fast | Fast |

Examples 15–18 exemplify remoistenable adhesive compositions comprising an amorphous linear water dispersible copolyester and a crystalline water dispersible polyamide. These compositions also exhibit a fast rate of bond formation combined with good blocking resistance.

What is claimed is:

1. A method of reinforcing a container comprising:
   a) providing a continuous fibrous composite comprising a continuous fibrous substrate coated on at least one surface with a moisture activatable adhesive composition;
   b) positioning said continuous fibrous composite between at least two layers of a container; and
   c) exposing said layers to moisture such that a fiber tearing bond is formed.

2. A method of reinforcing a container comprising:
   a) providing a continuous fibrous composite comprising a continuous fibrous substrate coated on at least one surface with a moisture activatable adhesive composition,
   b) moistening said continuous fibrous composite; and
   c) positioning said continuous fibrous composite on the surface of a container.

3. The method of claim 1 wherein said adhesive composition is a remoistenable adhesive.

4. The method of claim 3 wherein said adhesive composition is a hot melt remoistenable adhesive.

5. The method of claim 2 wherein said adhesive composition is a remoistenable adhesive.

6. The method of claim 5 wherein said adhesive composition is a hot melt remoistenable adhesive.

7. The method of claim 1 wherein said adhesive composition exhibits good block resistance when tested according to the Blocking Resistance Test Method.

8. The method of claim 3 wherein said remoistenable adhesive composition is disposed on at least two opposing surfaces of said composite.

9. The method of claim 2 wherein said container comprises a handle, said composite being disposed on a surface of said handle.

10. The method of claim 1 wherein said composite is a tape ranging in width from about 0.2 mm to about 90 mm.

11. The method of claim 1 wherein said composite is a string ranging in size from about 0.5 mm to about 5 mm.

12. The method of claim 1 wherein said fibrous substrate is comprised of fiberglass, polyester, rayon, nylon, aramide fiber, a woven web, a non-woven web, and mixtures thereof.

13. The method of claim 1 wherein the softening point of the fibrous substrate is greater than about 170° C.

14. The method of claim 1 wherein said adhesive composition is a dried remoistenable water based adhesive and exhibits good block resistance when tested according to the Blocking Resistance Test Method.

15. The method of claim 1 wherein said adhesive composition comprises at least 50% moisture activatable ingredients.

16. The method of claim 1 wherein said adhesive composition comprises at least one moisture activatable polymer.

17. The method of claim 7 wherein said adhesive composition is nonblocking at 38° C. and 90% relative humidity.

18. The method of claim 4 wherein said adhesive composition comprises:
   a) from about 10% by weight to about 90% to by weight of at least one crystalline water sensitive thermoplastic polymer;
   b) from about 10% by weight to about 90% by weight of at least one amorphous water sensitive thermoplastic polymer; and
   c) up to about 30% by weight of at least one wax.

19. The method of claim 2 wherein said adhesive composition exhibits good block resistance when tested according to the Blocking Resistance Test Method.

20. The method of claim 19 wherein said adhesive composition is nonblocling at 38° C. and 90% relative humidity.

21. The method of claim 6 wherein said adhesive composition comprises:
   a) from about 10% by weight to about 90% by weight of at least one crystalline water sensitive thermoplastic polymer;
   b) from about 10% by weight to about 90% by weight of at least one amorphous water sensitive thermoplastic polymer; and
   c) up to about 30% by weight of at least one wax.

22. A method of making a container, said method comprising:
   a) positioning a continuous fibrous composite between a first layer of a container composite and a second layer of a container composite, said continuous fibrous composite comprising a continuous fibrous substrate and a moisture activatable adhesive composition disposed on at least one surface of said continuous fibrous substrate; and
   b) exposing said layers to moisture such that a fiber tearing bond is formed between said continuous fibrous composite and at least one of said first layer and said second layer.

* * * * *